I. A. SABIN.
STEAM ROAD VEHICLE.
No. 104,888. Patented June 28, 1870.
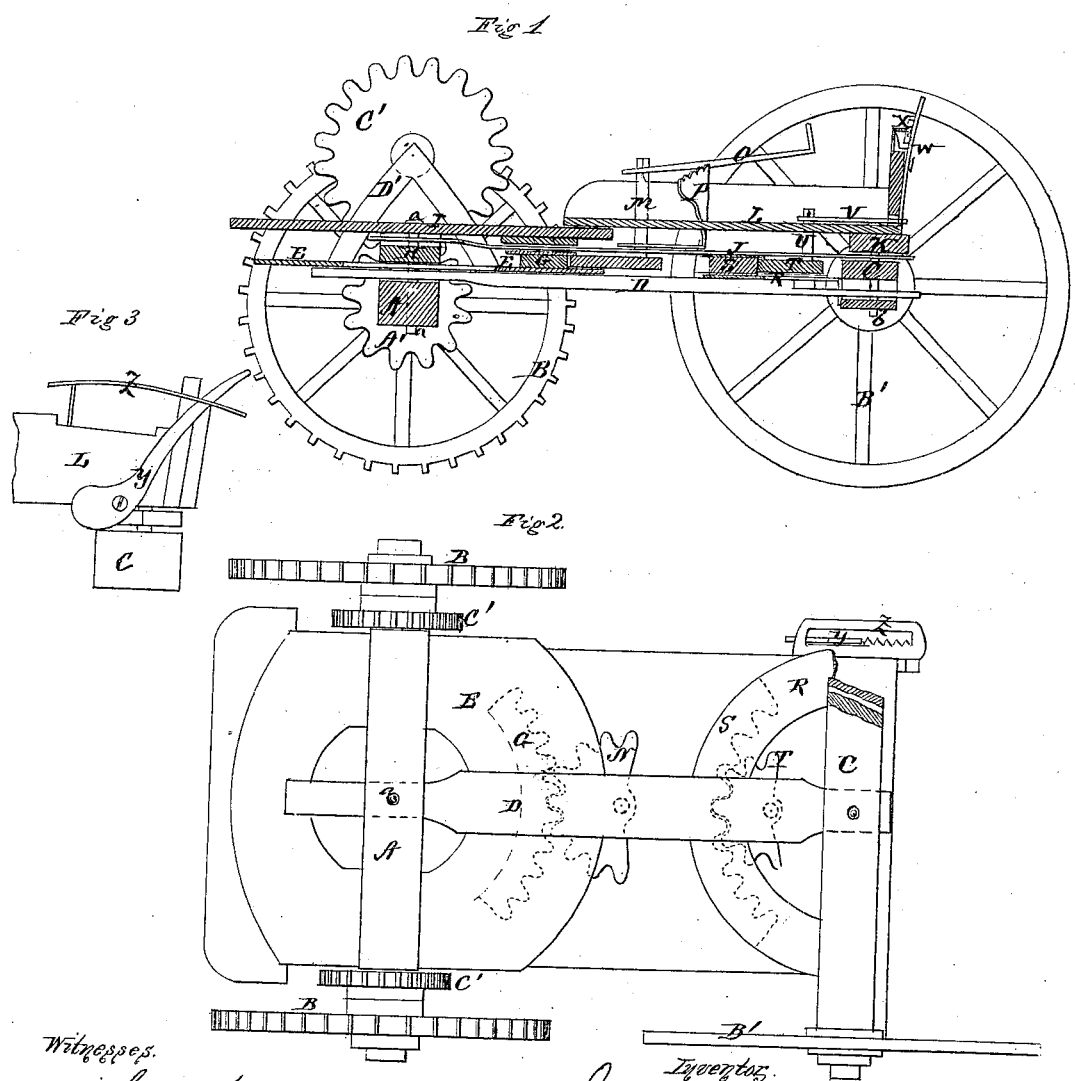

United States Patent Office.

IRA A. SABIN, OF LOCUST LANE, PENNSYLVANIA.

Letters Patent No. 104,888, dated June 28, 1870.

IMPROVEMENT IN STEAM ROAD-VEHICLES.

The Schedule referred to in these Letters Patent and making part of the same.

*To all whom it may concern:*

Be it known that I, IRA A. SABIN, of Locust Lane, in the county of Indiana and in the State of Pennsylvania, have invented certain new and useful Improvements in Steam Road-Vehicles; and do hereby declare that the following is a full, clear, and exact description thereof, reference being had to the accompanying drawing and letters of reference marked thereon making a part of this specification.

The nature of my invention consists in the construction and arrangement of a "steam road-vehicle," as will be hereinafter fully set forth.

In order to enable others skilled in the art to which my invention appertains to make and use the same, I will now proceed to describe its construction and operation, referring to the annexed drawing, in which—

Figure 1 is a longitudinal vertical section, and

Figure 2, a bottom view of my invention.

Figure 3 is a section of the rear portion of the vehicle, showing a device for trimming the bed of the wagon.

A represents the front axle, having at each end a wheel, B, which is provided on its circumference with cogs, as seen in fig. 1.

The front axle A is connected with the rear axle C by means of the perch-pole D, which is pivoted to both axles, to the front axle in a recess, and to the rear axle in a slot on the same.

On the top of the front axle A is secured the fifth wheel, E, which is provided on its upper side, near the rear, with a segmental rack, G.

The king-bolt $a$, which pivots the perch-pole D to the front axle A, passes also through the front bolster H, and a platform, I, placed on top of the same.

In a recess on top of the front bolster H is placed a metal bar, J, through which the king-bolt $a$ also passes, said bar extending toward the rear, running parallel with the perch-pole D, and the bolt $b$, which pivots said pole in the rear axle, passes also through the rear end of the bar J.

The rear bolster K is also pivoted by the bolt $b$ passing through it, and has the wagon-bed L firmly attached to its upper side, said bed extending forward to lap over the rear end of the platform I.

Through the front end of the bed L passes a vertical shaft, M, provided at its lower end, between the bar J and perch-pole D, with a segmental rack, N, which gears with the rack G above mentioned; and a lever, O, being attached to the upper end of the shaft M, the front axle A and wheels B B may be turned in either direction, so as to turn the wagon.

The lever O is held in any position desired by means of a ratchet standard, P, as shown in fig. 1.

To the front side of the rear axle C is attached a semicircle, R, resting upon the perch-pole D, said semicircle being on its upper side provided with a segmental rack, S, having the cogs on the inside. This rack is operated for the purpose of moving the hind wheels B' B', when it is desired to turn short curves, by means of another segmental rack, T, secured on the lower end of the shaft U, which passes up through the bed L, and is provided with a lever, V. This lever passes out through a slot in the rear end of the bed L, and is operated by means of another lever, W, which is pivoted on the rear end of the bed, and held in any position desired by means of the ratchet-bar X.

On the side of the bed L is pivoted a cam-lever, $y$, for the purpose of trimming the bed when the carriage is moving on a side hill. This cam-lever is held in any position desired, in a ratchet-bar, Z, as shown in fig. 2, the cam operating on the top of the hind axle C, as shown in fig. 3.

There should be one of these levers attached to each side of the bed L.

On the hub, on the inside of each front wheel, B, is formed or secured a cog-wheel, A', which is operated by means of another cog-wheel, C', placed perpendicularly above the same, its journals having their bearings in standards D' D'.

The cog-wheels C' C' are turned by pitmen or pistons from an engine placed on the platform I. It will thus be seen that the motive power is applied to the front wheels directly above the point where said wheels rest on the ground, and hence there can be no loss of power.

One or more wagons may be attached to the hind axle C, for carrying heavy loads.

Having thus fully described my invention,

What I claim as new, and desire to secure by Letters Patent, is—

1. The arrangement, on the side of the bed L, of the cam-lever $y$ and the ratchet-bar Z, substantially as and for the purposes herein set forth.

2. The arrangement of the cog-wheels B A' C', standards D', segmental racks G N S T, shaft M, lever O, ratchet P, shaft U, levers V W, and ratchet-bar X, with their various parts, all constructed and operating substantially as set forth.

In testimony that I claim the foregoing. I have hereunto set my hand this 23d day of March, 1870.

IRA A. SABIN.

Witnesses:
A. N. MARR,
A. A. YEATMAN.